United States Patent [19]

Putnam et al.

[11] Patent Number: 5,065,309
[45] Date of Patent: Nov. 12, 1991

[54] PERSONAL COMPUTER NOTE-TAKING FACILITY

[75] Inventors: William H. Putnam, Tinton Falls, N.J.; Theodore A. Shaffer, San Carlos, Calif.

[73] Assignees: AT&T Bell Laboratories; Conversion Technologies, both of Murray Hill, N.J.

[21] Appl. No.: 298,878

[22] Filed: Jan. 18, 1989

Related U.S. Application Data

[63] Continuation of Ser. No. 715,279, Mar. 25, 1985, abandoned.

[51] Int. Cl.[5] .......................... G06F 3/02; G06F 3/14
[52] U.S. Cl. .................................. 364/419; 364/225; 364/225.4; 364/225.6; 364/DIG. 1
[58] Field of Search ... 364/200 MS File, 900 MS File; 179/2 DP, 2 A, 2 R, 27 FH

[56] References Cited

U.S. PATENT DOCUMENTS

| | | | |
|---|---|---|---|
| 4,375,582 | 3/1983 | Gist et al. | 179/27 FH |
| 4,476,349 | 10/1984 | Cottrell et al. | 179/27 FH |
| 4,527,013 | 7/1985 | Hardy | 179/27 FH |
| 4,582,959 | 4/1986 | Myslinski et al. | 179/27 FH |

OTHER PUBLICATIONS

*Pop-Up Notepad*, Bellsoft, Inc., Sep. 1984.

Primary Examiner—David Y. Eng
Attorney, Agent, or Firm—Ronald D. Slusky

[57] ABSTRACT

A personal computer having an associated telephone is provided with a note-taking facility integrated therewithin. The operation of the note-taking facility is automatically initiated by the computer in response to the entering into a telephone transaction by the user. Specifically, the user is prompted when the telephone transaction is entered into for an indication as to whether notes are to be taken during that transaction. If the user gives an affirmative such indication, the facility immediately adapts itself to begin to receive the notes and present them on the computer display. An association is maintained between the notes taken during an individual telephone transaction and the party with whom the user was engaged during the transaction and the notes associated with a party are automatically retrieved and displayed for the user when a subsequent telephone transaction with that party is entered into.

7 Claims, 7 Drawing Sheets

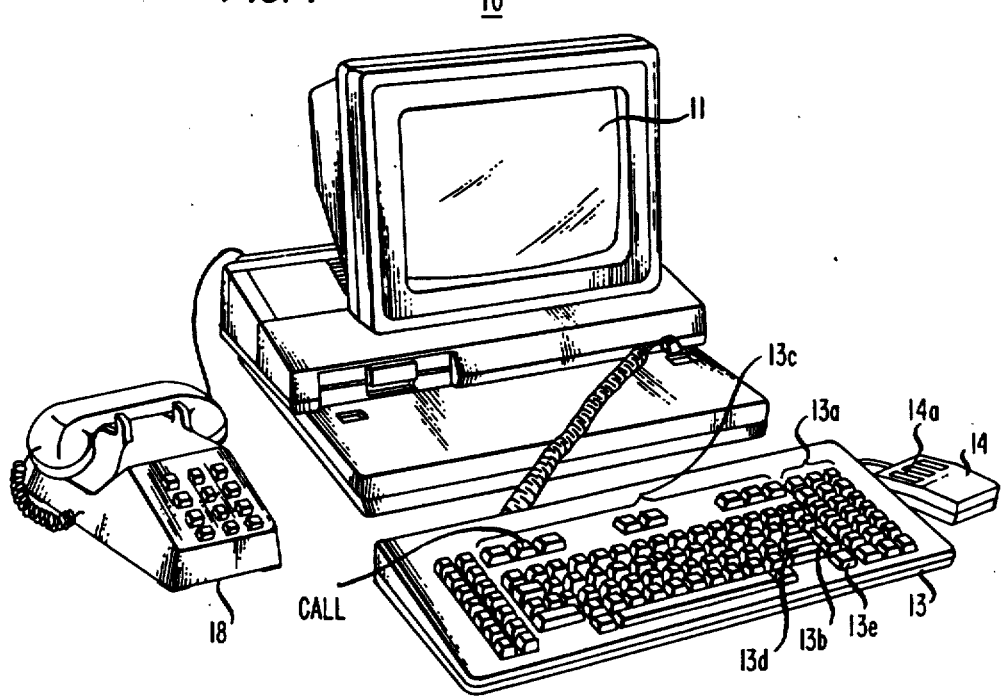

5,065,309

PERSONAL COMPUTER NOTE-TAKING FACILITY

This application is a continuation of application Ser. No. 715,279, filed on Mar. 25, 1985, now abandoned.

BACKGROUND OF THE INVENTION

The present invention relates to arrangements for entering telephone notes into a computer.

Among the various programs available for present-day computers—particularly personal computers—are programs that enable the user to type in and store notes during a telephone conversation. Often, however, the known arrangements are not particularly convenient to use. Typically, the note-taking program is stored on a floppy disk or other such medium. When the user desires to take notes, he/she must first retrieve the floppy disk, physically insert it into the disk drive and wait for the program to be read into computer main memory.

SUMMARY OF THE INVENTION

Clearly, a more desirable solution is to have the note-taking facility of the computer integrated therewithin in such a way that it is always readily accessible. Indeed, the present invention is directed to a note-taking facility of that type. In particular, the invention is adapted for use in a computer that has a telephone interconnected therewith and, in accordance with the invention, the operation of the note-taking facility is automatically initiated by the computer in response to the entering into a telephone transaction by the user, the term "telephone transaction" including, for example, the dialing of an outgoing call or the answering of an incoming call by, for example, picking up the telephone handset.

In preferred embodiments of the invention, and in accordance with a feature thereof, the user is prompted when the telephone transaction is entered into for an indication as to whether notes are to be taken during that transaction. If the user gives an affirmative indication, the facility immediately adapts itself to begin to receive the notes and present them on the computer display as they are typed.

Also in preferred embodiments of the invention, and in accordance with a further feature thereof, an association is maintained between the notes taken during an individual telephone transaction and the party with whom the user was engaged during the transaction. Notes associated with that party can thereafter be retrieved by specifying, for example, the name of the party. Specifically, in accordance with yet a further feature of the invention, the notes associated with a party are automatically retrieved and displayed for the user when a subsequent telephone transaction with that party is entered into.

BRIEF DESCRIPTION OF THE DRAWING

In the drawing,

FIG. 1 depicts a personal computer in which the present invention is illustratively implemented;

FIG. 2 shows the layout of certain ones of the keys of the keyboard of the computer of FIG. 1;

DETAILED DESCRIPTION

Figure 3:
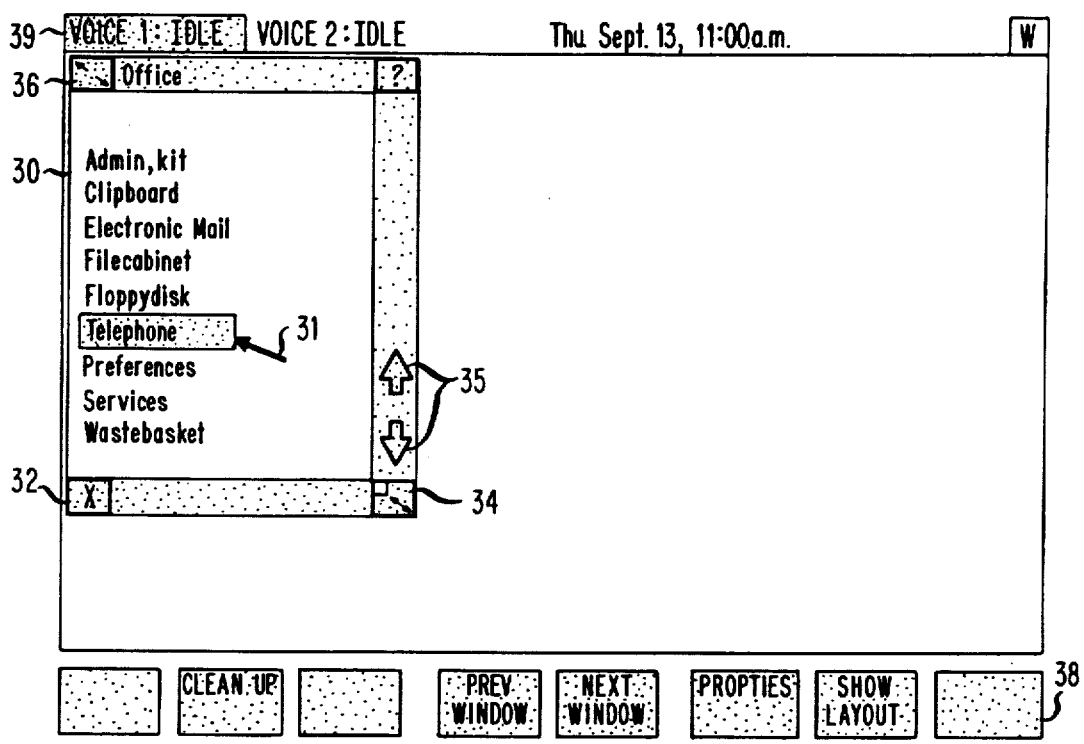
FIGS. 3-10 show various "windows" displayed by the computer of FIG. 1 as its operation proceeds.

Personal computer 10 depicted in FIG. 1 operates under a predetermined operating system—illustratively the UNIX TM operating system. The computer includes a screen 11, keyboard 13 and mouse 14 as well as other internal components not explicitly shown in FIG. 1, such as a floppy diskette drive and hard disk drive. The keyboard and mouse, more particularly, provide a mechanism for the user to input information and instructions to the computer. In particular, FIG. 2 shows the layout of certain ones of the keyboard keys—system control keys 13a—certain ones of which are discussed hereinbelow.

Associated with computer 10 is a telephone 18. Connectors (not shown) on the back of computer 10 allow for connection of telephone 18, as well as at least one telephone line, to the computer.

The operating system provides a windowing interface to the user whereby various tasks that the user may be performing are displayed as separate screen areas called windows. The functionality and ways of implementing this windowing capability are well-known in the art. Indeed, windowing is a feature of a number of commercially marketed, e.g., Apple, computers. It will be helpful, however, to review the windowing capability of computer 10 to set the environment for the present invention.

Referring, then, to FIG. 3, there is shown a so-called Office window 30 that is displayed after the computer is turned on and has performed some initial tasks, including the "booting" the operating system from the aforementioned hard disk unit, and the user has logged in.

The Office window displays a menu of so-called "objects." In particular, the Admin.kit contains functions used for computer housekeeping and maintenance purposes; the Clipboard is a temporary location for information being transferred from one place to another; the File cabinet is where work done by the user is stored; Telephone, which is the object that the present invention is most closely associated with, contains various telephone commands and functions; Preferences is used to customize the environment and displays on the computer, one such preference being whether the Call Screen described below should be presented to the user when, for example, the telephone handset is lifted on an outgoing call; Services provides access to particular application software, such as language compilers; and the Wastebasket contains information that has been previously deleted.

In addition, a so-called status line 39 is always displayed at the top of the screen. The computer has the capability of having connected thereto two telephone lines—both of which, in this example, have been designated in Admin.kit to be "voice", as opposed to "data", lines—and the status line shows the current status of each line, e.g., IDLE, ACTIVE, HOLD, etc. Highlighting shows which of the two lines is currently "selected". The current date and time are also displayed.

The screen display also includes eight screen keys 38 which bear legends corresponding to functions that are performed in response to the operation of the spatially corresponding ones of keyboard function keys 13c. These labels and the corresponding 'functions are changed from time to time as different windows are displayed and/or different computer functions invoked.

The user is provided with a number of capabilities with respect to whatever window is currently being worked with. For example, the user "points to" particular object desired to be accessed by causing it to be highlighted. In FIG. 3, in particular, the Telephone object in the Office window is highlighted. The highlighting is controlled either via movement of mouse 14 in such a way that its cursor 31 points to the object in question, or by operation of appropriate ones of the "system control" keys on keyboard 13, denoted generally as 13a. As mentioned above, a map of keys 13a is shown in FIG. 2. At least some of these keys have dual system control functions, as are described below, while others serve as keys of a numeric input pad (not depicted in FIG. 2). These alternative functions are invoked either by depressing one of shift keys 13d or number lock key 13e in conjunction with the desired system control key.

System control keys 13a, more particularly, illustratively include a Beg (begin) key that causes the top item in the list to be pointed to, or highlighted; an End key that causes the last item in the list to be pointed to; a Next (Prev) key which causes the next (previous) item to be pointed to. A window can be closed either by operating another one of keys 13a—the Exit key—or by pointing to exit icon 32 of window 30 with mouse-controlled cursor 31 and then "selecting" the icon by depressing key 14a on the mouse. Other window-related functions can also be invoked either from particular ones of action keys 13a or by pointing to and selecting corresponding window icons such as help icon 33, window sizing icon 34, scrolling icons 35 and window movement icon 36. (It may also be noted at this point that status line 39 further includes a window manager icon 33 which, when pointed to and selected, displays a window listing all the then-open windows, any of which can be made the "active" window by pointing to and selecting it.)

Figure 4:
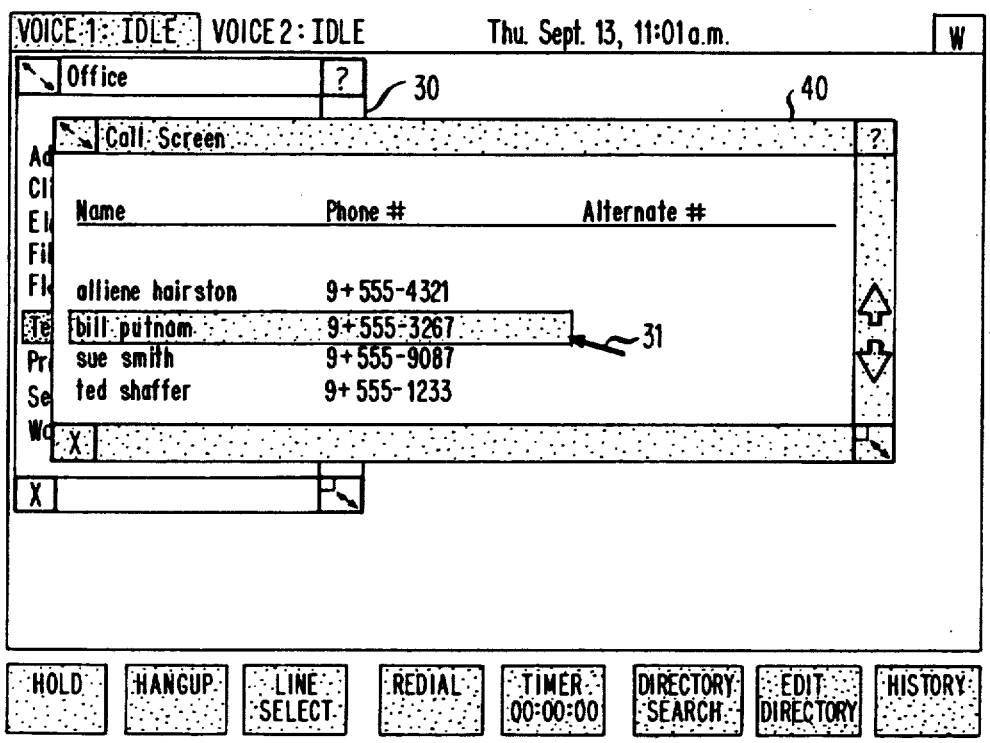

Once the desired object—"Telephone" in this case—is pointed to, it can be selected by the user, either via mouse key 14a or by operating Enter key 13b of keyboard 13. This causes a second window, Call Screen 40, to be displayed on screen 11 superimposed over Office window 30, as shown in FIG. 4. Note that this window, like all windows created by the system, has its own set of icons. Note also that Call Screen 40 has a dark border, indicating that it is now the "active" window, while the border of the Office window, originally dark, is now light. In addition, screen keys 38 now have different labels, corresponding to various telephone functions. These include hold and hang-up, line select, redial and call timer functions. Other functions enable the user to search and edit the directory of stored names and numbers and to retrieve a history of calls.

Displayed in Call Screen 40 is a list of names and telephone numbers previously a) entered by the user in a directory of such entries and b) designated by the user to appear in the Call Screen (because, for example, they are the numbers most frequently called by the user). A call to a particular one of the listed individuals is initiated by pointing to the desired entry—"bill putnam" in this case—and then selecting it.

(If the entry for a party was not designated to be in the Call Screen, pressing the Page key of keys 13a will cause the Call Screen to be replaced by a Directory screen (not shown in the drawing) containing the entire directory of entries. Once the desired entry is found by, for example, scrolling through the directory, that entry can then be pointed to and selected. Alternatively, pressing the one of function keys 38 associated with the Directory Search screen key opens a new, Search window (not shown in the drawing) into which the user can type search information, such as the name, or a fragment of the name, of the party. The user then presses Enter key 13b. Assuming that a matching directory entry is found, the Search window disappears and the entry is displayed highlighted in the Directory screen.)

At this point, the computer calls the listed telephone number via circuitry described hereinbelow. The user need only pick up the handset of telephone 18 and speak when the called party answers.

Figure 12:
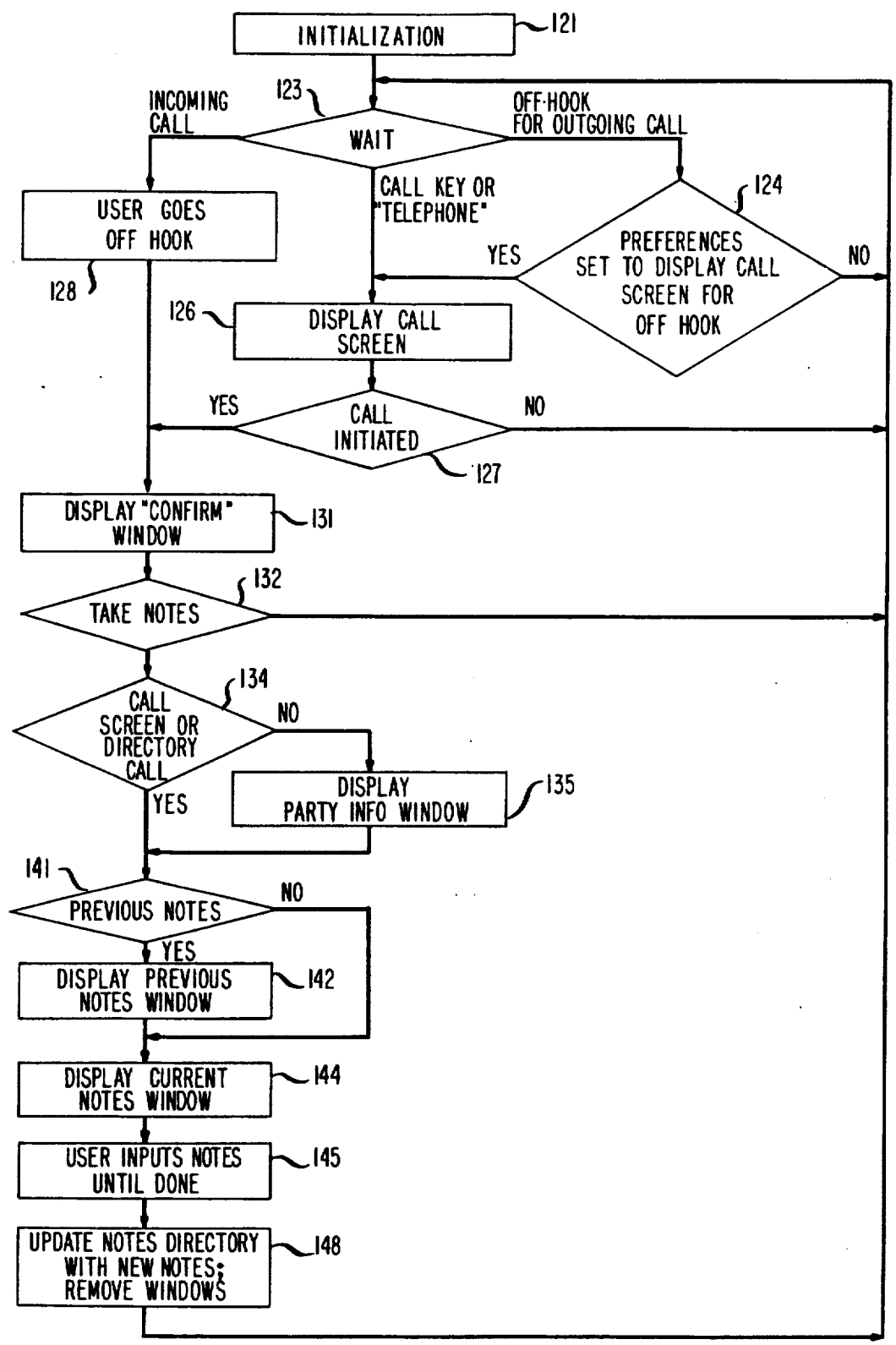
FIG. 12 is a flowchart depicting the operation of computer 10 vis-a-vis its note-taking facility in accordance with the invention.

In accordance with the present invention, the fact that the user has initiated a telephone transaction—in this case an outgoing call—automatically initiates the operation of the computer note-taking facility. A flowchart of the programming that implements this facility is shown in FIG. 12 and is discussed hereinafter. For the present, however, the note-taking facility will be described in the context of the various windows that are displayed as the note-taking proceeds.

Figure 5:
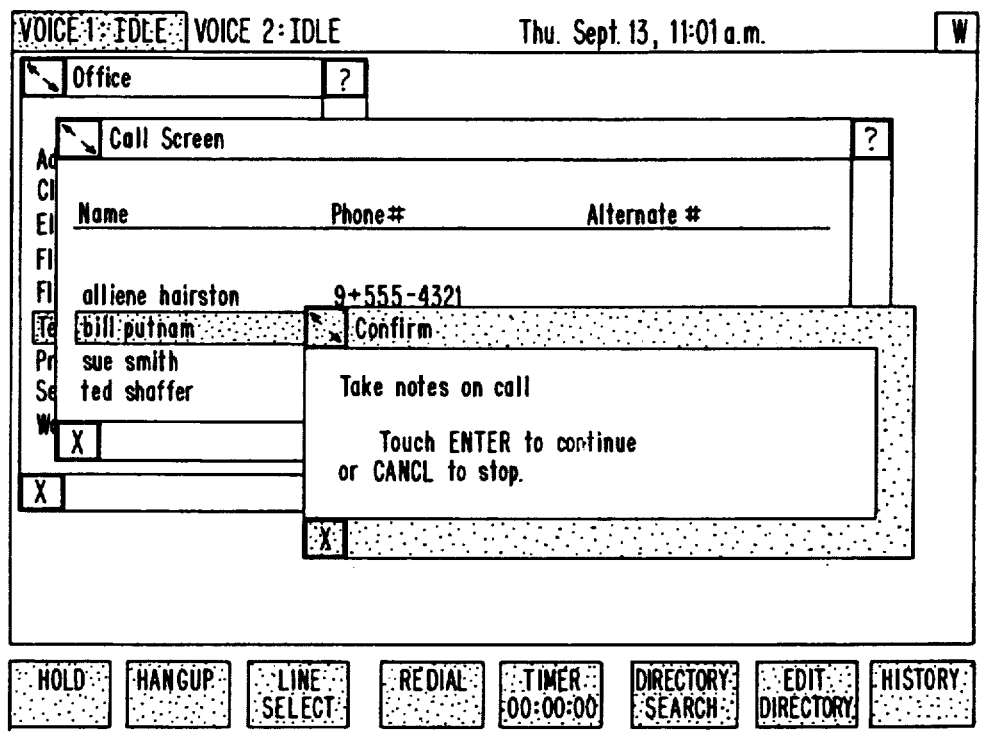

In particular, the computer now displays a Confirm window 50, as shown in FIG. 5. If the user does nothing at this point, window 50 simply disappears after a predetermined time interval. Once the call is over and the user hangs up, he/she may, for example, initiate another call from Call Screen 40 or may choose to close out the Call Screen.

Figure 6:
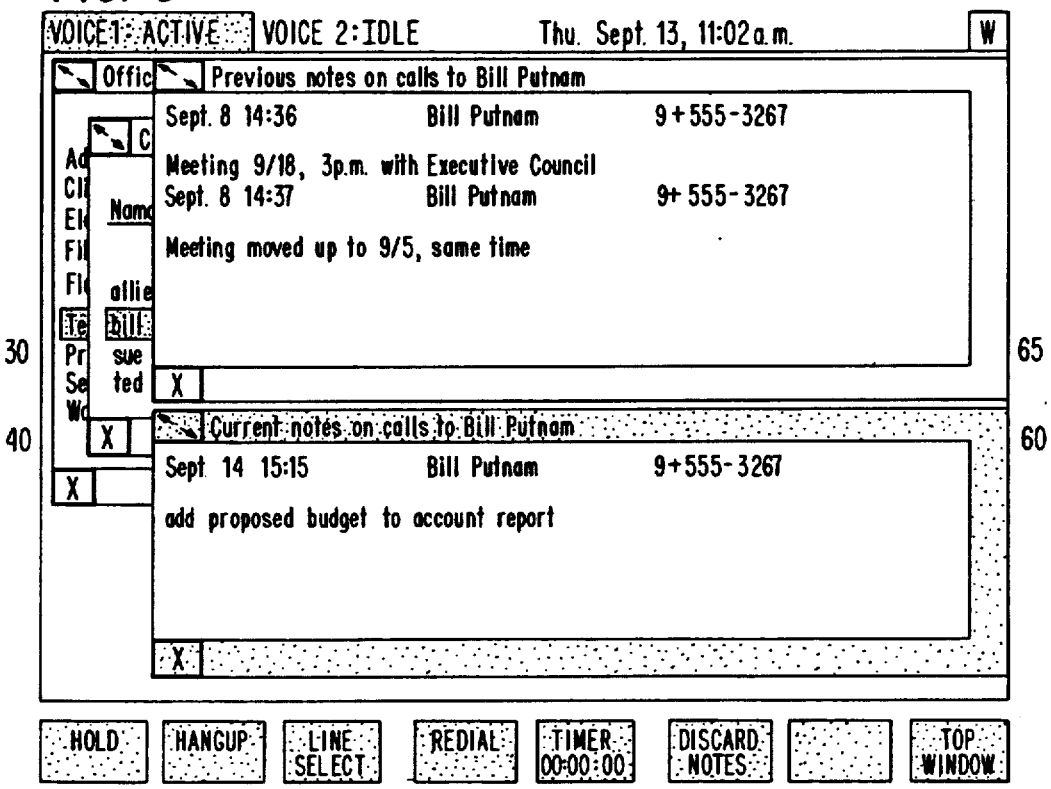

If, on the other hand, the user does wish to take notes on the call, he/she pushes Enter key 13b when Confirm window 50 is displayed. This causes the computer to display other window, Current Notes window 60, shown in FIG. 6. At this point, the user may type in from keyboard 13 any desired notes associated with the telephone call and these appear in window 60 as they are typed. At the same time, any previously typed-in notes associated with the same called party are also displayed in yet another window—Previous Notes window 65. Window 60 is the currently active window. In order to make window 65 the active window, the user can, for example, operate the one of function keys 13c associated with the "TOP WINDOW" screen key. Another alternative, which, indeed, can be used to make any window the active window and bring it to the foreground of the display, is to use mouse 14 to point to any area of the window in question and then select it. Once window 65 is made active, the user can scroll through the previous notes using, for example, particular ones of system control keys 13a. The TOP WINDOW screen key becomes a BOTTOM WINDOW screen key at this time, thereby providing a mechanism for again making the Current Notes window active.

If at any point the user decides to discard the notes entered into the Current Notes screen, this is accomplished by pressing the one of function keys 13c associated with the DISCARD NOTES screen key. Otherwise the notes are saved once window 60 is exited, at which point windows 60 and 65 both disappear and Call Screen 40 (FIG. 4) is again the active window.

Other mechanisms for initiating an outgoing call are also provided by the computer. For example, an alternative way to open the Call Screen and make it active is to press shift key 13d in conjunction with particular one of function keys 13c—denoted Call in FIG. 1. In addition, once the Call Screen has, by whatever means, been made active, outgoing calls can be initiated by a) typing a telephone number from the keyboard or typing a name or a unique fragment of a name stored in the above-mentioned telephone directory and b) pressing Enter key 13b. In this case, the directory is searched in order to find the appropriate telephone number. As before, the Confirm window will appear, thereby affording the user an opportunity to take notes on the call.

Figure 7:
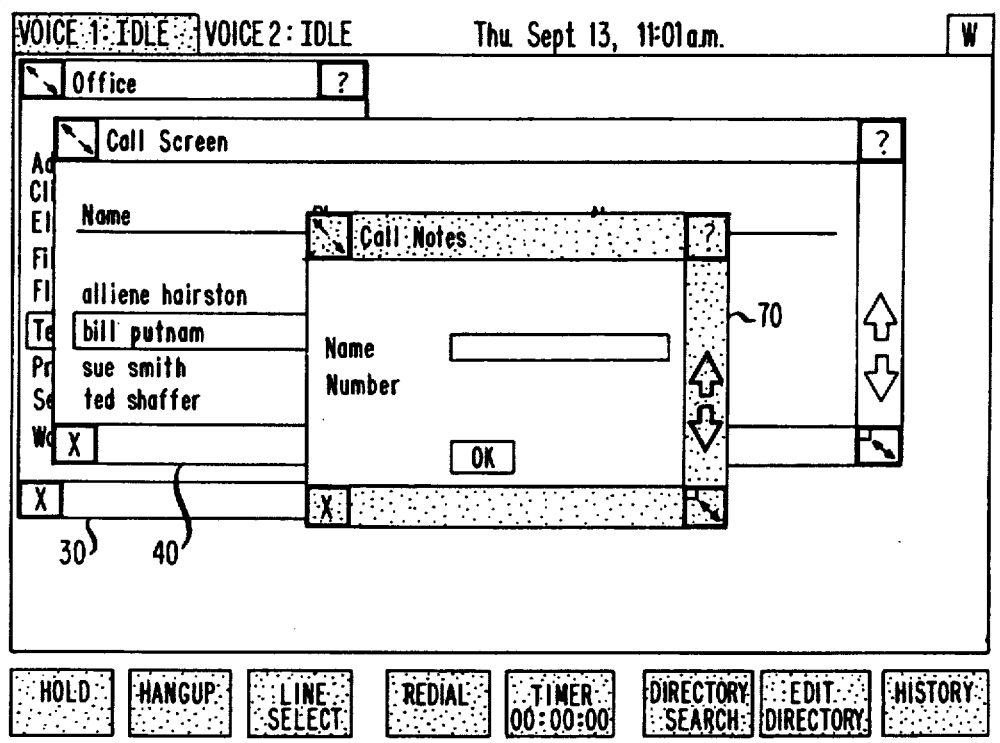

For telephone calls dialed by typing a telephone number from the keyboard, as described above, as well as in the case of incoming calls, the note-taking facility of the computer is entered into in a slightly different way. In each of these cases, in particular, a Call Notes window is automatically displayed. As shown in FIG. 7, this window, denoted as window 70 provides a space 71 into which the user is to type the name of the other party. If the call was dialed by typing a number onto the screen, the telephone number dialed is displayed in window 70. Otherwise, i.e., in the case of an incoming call, a space 72 is provided for the user to enter the telephone number of that party, if desired. Once the Call Notes window information has been typed in and the user presses Enter key 13b, the Call notes window disappears and Current Notes and Previous Notes windows 60 and 65 are presented, as before.

Figure 8:
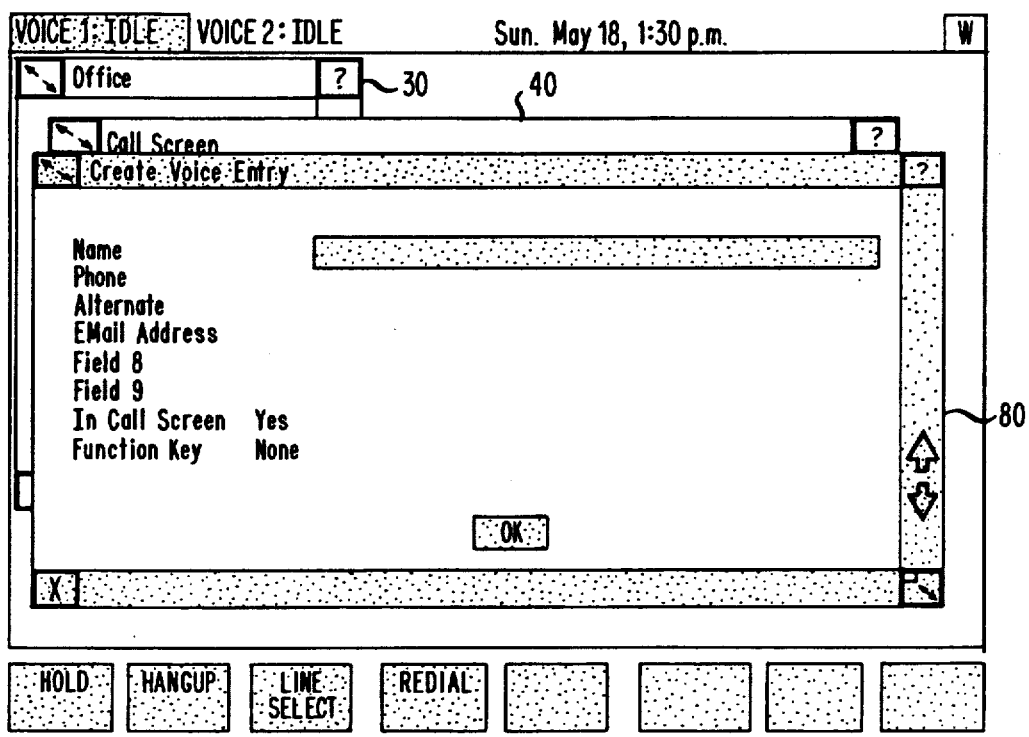

Directory entries are created and/or edited by pressing the one of function keys 13c corresponding to the EDIT DIRECTORY screen key that appears in conjunction with the Call Screen (FIG. 4). The user is thereupon provided with an Edit Directory window in which one of these options as "Create Voice Entry," "Create Data Entry," "Delete Entry" and "Modify Entry" are presented for selection by the user. Once an option has been chosen, appropriate further windows are then presented. For example, when "Create Voice Entry" is selected, a window containing a form for the creation of a voice entry is presented. As shown in FIG. 8, this form, denoted 80, illustratively includes such items as the party's name, phone number, alternate phone number, and electronic mail address. The user can also specify, for example, whether or not the entry is to be a Call Screen entry. The form is exited and the entry saved when the user thereafter presses Enter key 13b.

Figure 9:
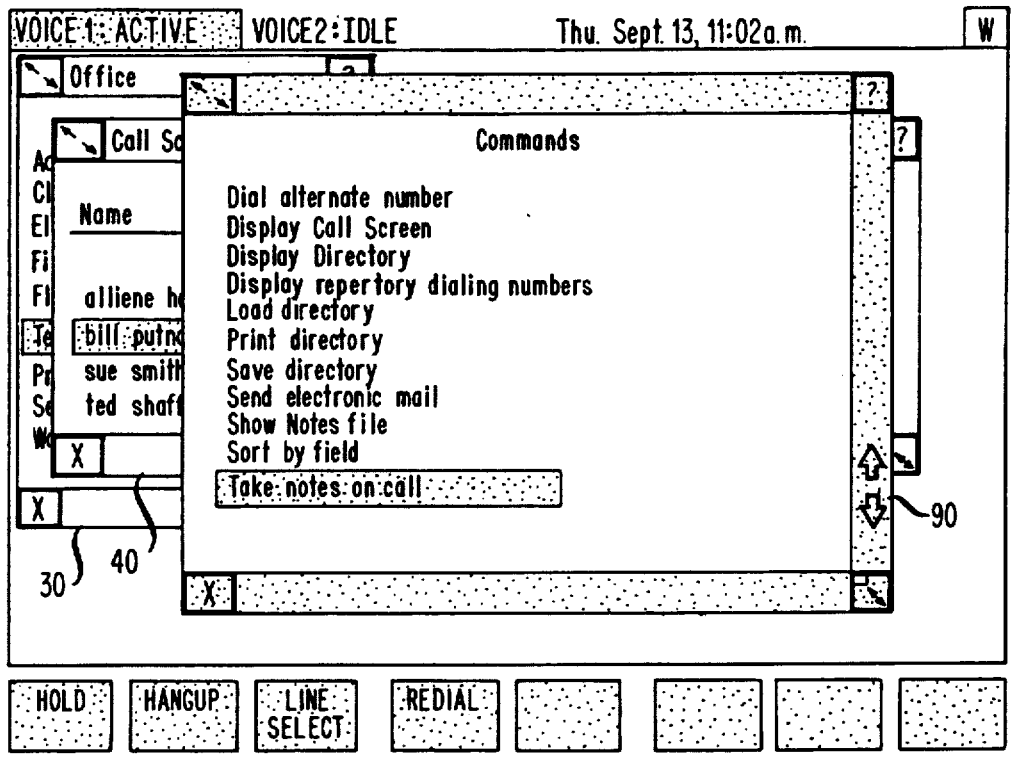
Figure 10:
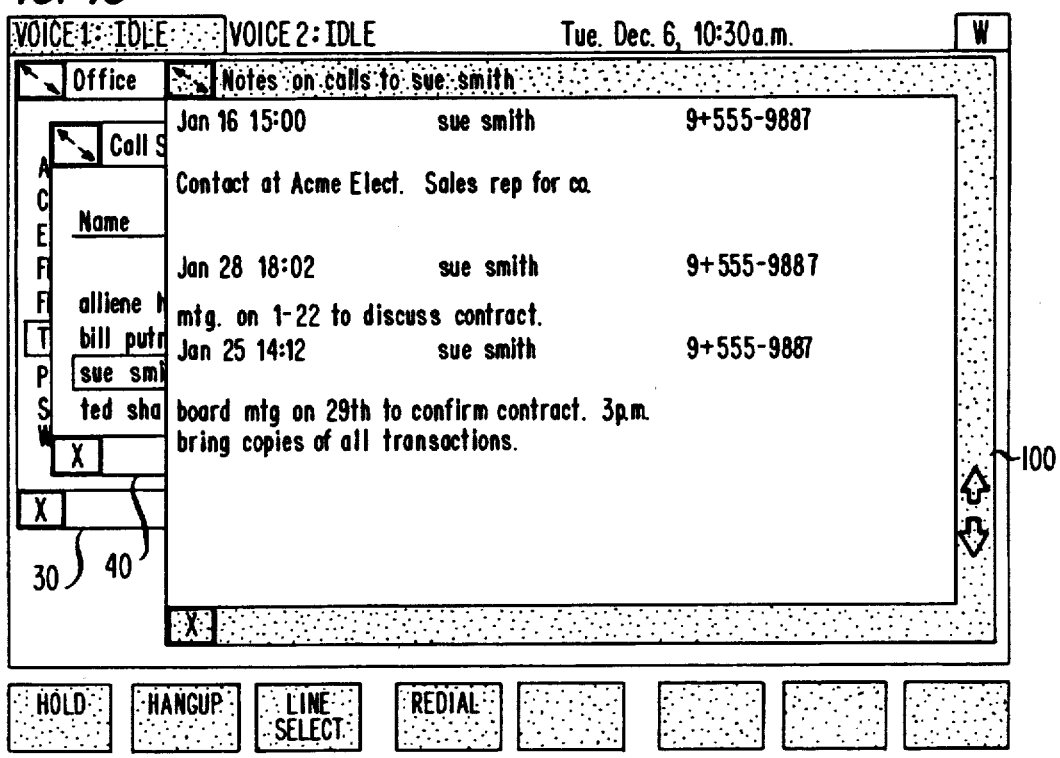

Other aspects of the note-taking facility are illustrated by FIGS. 9 and 10. In particular, if the user does not respond affirmatively to Confirm window 50 within the allotted time but nonetheless wants to take notes on a call, he/she can press the Command key, which is one of system control keys 13b. As shown in FIG. 9, this causes a window 90 of commands associated with the Call Screen to be displayed. By selecting and pointing to the entry "Take notes on call," the user causes Current and Previous notes windows 60 and 65 to be displayed as in FIG. 6. In addition, as illustrated in FIG. 10, selecting the entry "Show Notes file," causes all the notes for the highlighted entry to be displayed in a window 100.

We turn now to the hardware and software which implement the present illustrative embodiment of the invention.

Figure 11:
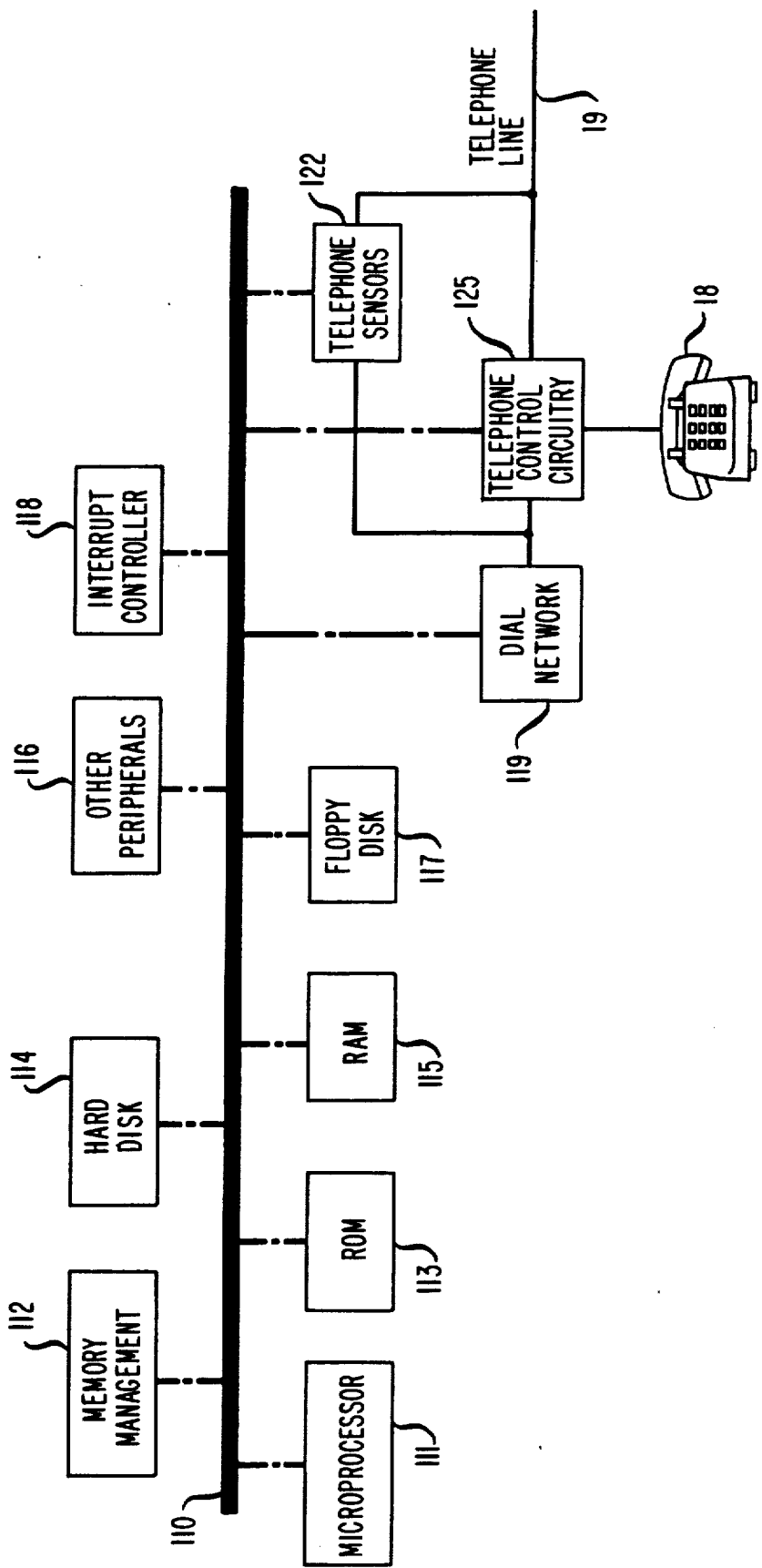
FIG. 11 is a simplified block diagram of the computer of FIG. 1.

FIG. 11 is a simplified block diagram of computer 10. At the heart of the computer is a microprocessor 111 which communicates with its peripherals via a bus 110. These peripherals include ROM 113, RAM 115, memory management circuitry 112, hard and floppy disk units 114 and 117, respectively, interrupt controller 118 and various other peripherals denoted collectively at 116. The computer also includes three other peripheral circuitries providing various telephone functionalities, these being dial network 119, telephone sensors 122 and telephone control circuitry 125.

Telephone control circuitry 125, in particular, is principally comprised of various relays which are operable to, for example, connect telephone set 18 and/or dial network 119, to the associated telephone line(s), one such telephone line 19 being shown in FIG. 11. A relay within circuitry 125 is also controllable by the processor to pulse the telephone line in simulation of rotary-dialed dial pulses. Dial network 119, is a circuit which operates under the control of processor 111 to dial out a telephone number using multifrequency tones, the choice as to whether pulses or tones are to be used being defined in the aforementioned Admin.kit. Telephone sensors 122 includes sensing circuits for detecting on/off hook and ringing conditions as well as, for example, busy and dial tones. These sensors are periodically polled by the processor.

The programming that implements the note-taking facility, and, indeed, the all of the computer's telephone-related operations is referred to herein as the "phone manager". This is one of the programs that is invoked, in the background, during the booting process. The phone manager takes this first opportunity to execute to perform some initialization including, for example, the loading in of the phone directory from hard disk 114, etc. At this time, the phone manager also executes a system call indicating a willingness to accept UNIX signals from a piece of software within the operating system referred to herein as the telephone hardware driver routine. The latter is accessed by processor 111 when, for example, the processor determines from a polling of sensors 122 that some change has occurred in the status of the telephone hardware, such as the taking of the telephone handset off hook. The driver routine, in turn, responds to such changes by generating a UNIX signal for the telephone manager.

FIG. 12 is a flowchart depicting those aspects of the phone manager program that are germane to the present invention. In particular, once the above-discussed initialization, indicated at 121, is complete, the program enters a wait state 123 from which it emerges when one of three events relevant to its note-taking facility occurs. (Other events not related to the note-taking facility, such as events which would necessitate a change in the information in status line 39, will also rouse the program from its wait state but these will not be discussed herein.)

The first possible event is that the user takes some action to make Call Screen 40 active, such as pressing the aforementioned Call Key or selecting the "Telephone" object from Office window 30. The program responds by displaying the Call Screen, as indicated at 126. As indicated at 124, another possible event is that the user has previously specified as one of his/her preferences that the phone manager is to be invoked when telephone 18 is taken off hook for the purpose of an outgoing call and that the telephone has, in fact, been taken off hook. Here again, the Call Screen is displayed, the triggering mechanism being a determination by processor 111 from one of its periodic polls of sensors 122 that the handset has been taken off hook.

As indicated at 127, if the user exits from the Call Screen without making a call either from that screen, from the Directory screen, or by typing in a telephone number, name or name fragment, the program returns to wait state 123. Otherwise, i.e., when an outgoing call through the computer is initiated, Confirm window 50 is displayed, as indicated at 131. The Confirm window is also displayed if the third possible event occurs, as indicated at 128—namely, a call comes in and the telephone is taken off hook. (It may also be noted that whenever the phone manager leaves wait state 123, and before it proceeds to blocks 124, 126 or 128, it checks to see if the user has changed since that last time the wait state was left; and if it has, the program performs some additional tasks, such as checking to see if a notes directory for that user exists and, if it does not, creating same.)

As indicated at 132, the program again returns to wait state 123 if the user does not provide an indication, as discussed above, that he/she desires to take notes. Assume, however, that the user does desire to take notes. If the call was not initiated from the Call Screen or Directory screen, as determined at 134, the program displays Call Notes window 70 in order to obtain information about the other party, e.g., his/her name. Otherwise this step is skipped, since the identity of the other party is already known by the computer.

Armed with the name of the other party, the program examines the files in a UNIX directory in which telephone notes are stored to determine, as indicated at 141, if previously taken notes for that party exist. If they do, those notes are displayed in Previous Notes window 65. If not, the program proceeds directly to display Current Notes window 60, as indicated at 144. The program then accepts typed input from the user, as indicated at 145, for as long as the user desires to type them. When the user is done entering the notes, he/she exits from window 60. As indicated at 148, the appropriate file in the aforementioned notes directory is thereupon created and/or updated with the newly entered notes, and the notes windows are removed.

The foregoing merely illustrates the principles of our invention. Those skilled in the art will be able to devise numerous arrangements which, although not explicitly shown or described herein, embody those principles and are within its spirit and scope.

What is claimed is:

1. A computer arrangement for use with a telephone, said arrangement including
   input means for generating a succession of characters,
   note-taking means including means operative for receiving from said input means characters representing notes taken by a user of said computer arrangement during a transaction over said telephone and for storing the received characters in said computer, and
   means operative in response to the receipt of an incoming call on said telephone and operative in response to the initiating of a call by said user over said telephone for initiating said receiving and storing operation of said note-taking means.

2. A computer arrangement for use with a telephone, said arrangement including
   input means for generating a succession of characters,
   means operative in response to the entering into a transaction over said telephone by said user for prompting said user for an indication as to whether notes are to be taken during said transaction, and
   means operative in response to an affirmative such indication for receiving from said input means characters representing said notes and for storing the received characters in said computer.

3. A computer arrangement for use with a telephone, said arrangement including
   input means for generating a succession of characters,
   note-taking means including means operative for receiving from said input means characters representing notes taken by a user of said computer arrangement during an individual transaction over said telephone between said user and another party and for storing the receiving characters in said computer, and
   means operative subsequent to a first transaction over said telephone between said user and said party and in response to the initiation of a second call over said telephone to said party for retrieving and displaying notes taken during said first transaction and for initiating the operation of said note-taking means.

4. A method for operating a computer which has a telephone connected thereto and which includes note-taking means for receiving from an input device, operated by a user of said computer, notes taken during a transaction over said telephone and for storing said notes in said computer, said method comprising the steps of
   operating said computer to initiate the operation of said note-taking means in said computer in response to the initiating of a call by said user over said telephone.

5. A method for operating a computer which has a telephone connected thereto and which includes note-taking means for receiving from an input device, operated by a user of said computer, notes taken during a transaction over said telephone and for storing said notes in said computer, said method comprising the steps of
   operating said computer in response to the entering into a transaction over said telephone by said user to prompt said user for an indication as to whether notes are to be taken during said transaction, and
   operating said computer to initiate the operation of said note-taking means in said computer in response to an affirmative such indication.

6. The invention of claim 5 comprising the further step of operating said computer to retrieve and display, subsequent to a first transaction over said telephone between said user and a party, and in response to the initiation of a second telephone call over said telephone to said party, notes entered during said first transaction.

7. A method for operating a computer which has a telephone connected thereto and which includes note-taking means for receiving from an input device, operated by a user of said computer, notes taken during a first transaction over said telephone with another party and for storing said notes in said computer, said method comprising the steps of
   operating said computer to display the name of at least said party, the telephone number of said party being stored in said computer, and
   operating said computer in response to the pointing to the displayed name by said user to substantially concurrently automatically dial said telephone number and automatically retrieve and display said notes.

* * * * *